United States Patent
Jin et al.

(10) Patent No.: US 8,528,446 B2
(45) Date of Patent: Sep. 10, 2013

(54) PARKING LEVER COVER FOR VEHICLE

(75) Inventors: Jaewan Jin, Seongnam-si (KR); Hayun Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 572 days.

(21) Appl. No.: 12/837,057

(22) Filed: Jul. 15, 2010

(65) Prior Publication Data

US 2011/0120259 A1    May 26, 2011

(30) Foreign Application Priority Data

Nov. 23, 2009   (KR) .................. 10-2009-0113309

(51) Int. Cl.
*B60T 7/10*       (2006.01)
*G05G 1/06*       (2006.01)

(52) U.S. Cl.
USPC .............................. 74/558.5; 74/523; 74/537

(58) Field of Classification Search
USPC .............. 74/501.6, 523, 535, 536, 537, 540, 74/558.5; 16/DIG. 19, DIG. 12, 422, 430
IPC ..................................... B60T 7/10; G05G 1/06
See application file for complete search history.

(56) References Cited

U.S. PATENT DOCUMENTS

| | | | | |
|---|---|---|---|---|
| 5,640,741 A | * | 6/1997 | Yano ................................ | 16/421 |
| 5,735,178 A | * | 4/1998 | Barbunopulos .................. | 74/535 |
| 7,669,503 B2 | * | 3/2010 | Takeshima ....................... | 74/557 |

FOREIGN PATENT DOCUMENTS

| | | | | |
|---|---|---|---|---|
| DE | 20017904 U1 | * | 3/2001 | |
| JP | 02034454 A | * | 2/1990 | |
| JP | 8-324396 A | | 12/1996 | |
| JP | 9-2216 A | | 1/1997 | |
| JP | 9-66819 A | | 3/1997 | |
| JP | 9-240444 A | | 9/1997 | |
| JP | 2007-62583 A | | 3/2007 | |
| JP | 2008-74284 A | | 4/2008 | |
| JP | 2010018247 A | * | 1/2010 | |
| KR | 10-2009-0059254 A | | 6/2009 | |

* cited by examiner

*Primary Examiner* — Thomas Diaz
(74) *Attorney, Agent, or Firm* — Morgan, Lewis & Bockius LLP

(57) ABSTRACT

A parking lever cover for a vehicle can be easily and firmly attached to a parking lever frame having a large bend angle, easily manufactured, and provide the parking lever with an aesthetically elegant external appearance, thereby increasing commercial appeal of the vehicle.

6 Claims, 4 Drawing Sheets

PARKING LEVER COVER FOR VEHICLE

CROSS-REFERENCE TO RELATED APPLICATIONS

The present application claims priority to Korean Patent Application Number 10-2009-0113309 filed Nov. 23, 2009, the entire contents of which application is incorporated herein for all purposes by this reference.

BACKGROUND OF THE INVENTION

1. Field of the Invention

The present invention relates to a parking lever cover for a vehicle, in detail, a technology associated with a cover making the external appearance of a parking lever bending a lot.

2. Description of Related Art

A vehicle parking lever is a member that a user operates to park the vehicle that is usually disposed near console at the center of the vehicle.

Parking levers are recently modified in various ways to increase the volume of the console, prevent the parking levers from protruding, and improving the aesthetic appearance, while the bend angle has increased in the parking levers.

That is, the portion from the pivot axis to the end of the parking levers is not straight and bends, in which the bend angle reaches above 50°, even 60° to 70°.

When the bend angle of parking levers is too large, as described above, it is difficult to make the external appearance of the parking levers with a single cover as in the related art. This is because it is difficult to injection-mold a cover having a large bend angle from a single part and it also requires a very difficult work to attach the cover manufactured in this way to the lever frame.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a parking lever cover for a vehicle which can be easily and firmly attached to a lever frame having a large bend angle, easily manufactured, and give the parking lever with an aesthetically elegant external appearance, thereby increasing commercial quality of the vehicle.

An aspect of the present invention provides a parking lever cover for a vehicle, which includes a lower cover covering the bend and the lower portion of the bend in a lever frame, a grip cover connected with the lower cover while covering the upper portion of the bend from the lower cover, and a fixing mechanism fixing the connected grip cover and the lower cover to the lever frame.

Another aspect of the present invention provides a parking lever cover for a vehicle, which includes a lower cover covering the bend and the lower portion of the bend in a lever frame, a grip cover connected with the lower cover while covering the upper portion of the bend from the lower cover, a fixing mechanism fixing the connected grip cover and the lower cover to the lever frame, and a cover cap fitted on the front end of the grip cover.

The present invention can be easily and firmly attached to a lever frame having a large bend angle, easily manufactured, and give the parking lever with an aesthetically elegant external appearance, thereby increasing commercial quality of the vehicle.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
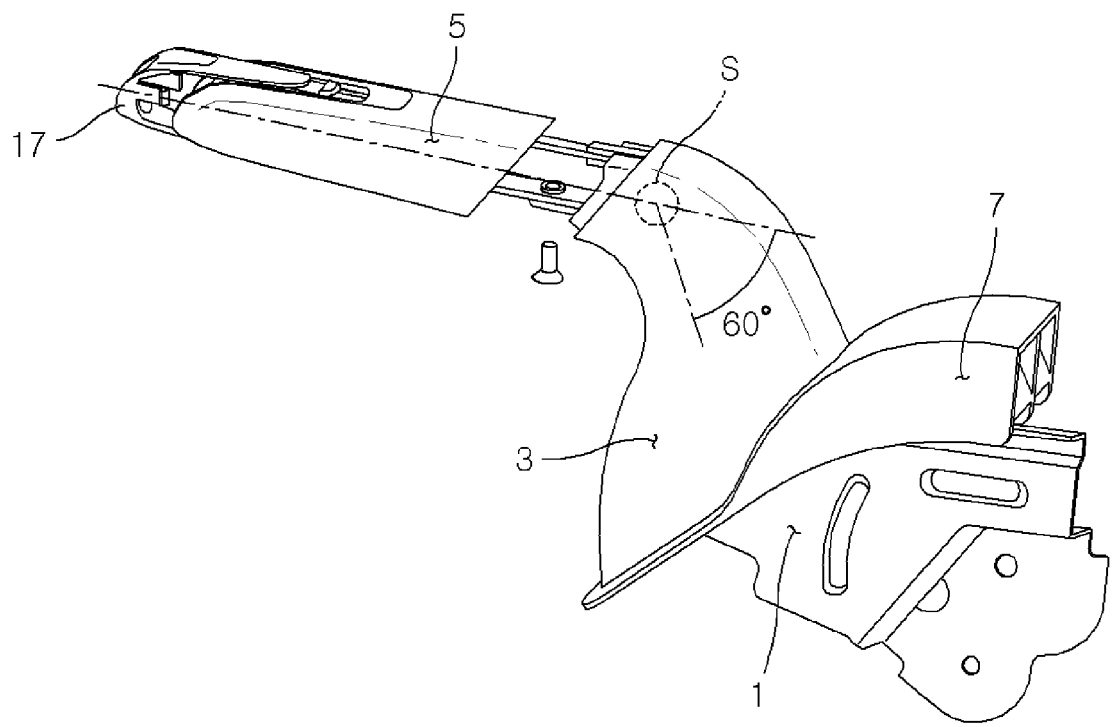
FIG. 1 is a view illustrating a parking lever cover for a vehicle fitted on a lever frame.
Figure 2:
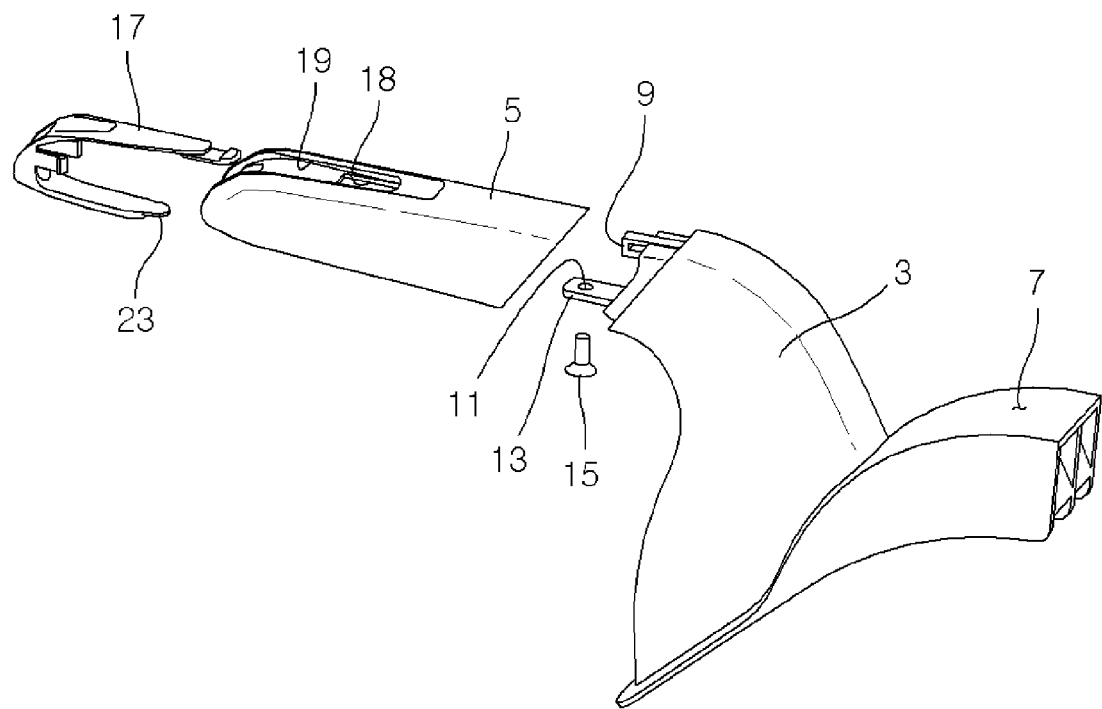
FIG. 2 is a view showing the parking lever cover parts without the lever frame in FIG. 1.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 5, the present invention generally includes a lower cover 3 covering a bend S and a lower portion of bend S of a lever frame 1, a grip cover 5 connected with lower cover 3 while covering an upper portion of bend S of lever frame 1, and a fixing mechanism fixing connected grip cover 5 and lower cover 3 to lever frame 1.

Grip cover 5 defines a straight portion that the driver grips, and lower cover 3 covers the outside of the lower portion from grip cover 5 of lever frame 1, in which lower cover 3 covers most of bend S and is connected with grip cover 5 at the end of bend S in lever frame 1. Grip cover 5 is connected with lower cover 3, forming a slope.

Lower cover 3 has an integral arc shield 7 at the lower portion to cover the parking brake system and an integral locking hook 9, which is secured to lever frame 1, at the upper portion of the portion connected with grip cover 5. The arc shield may be monolithically formed with the lower cover.

Figure 3:
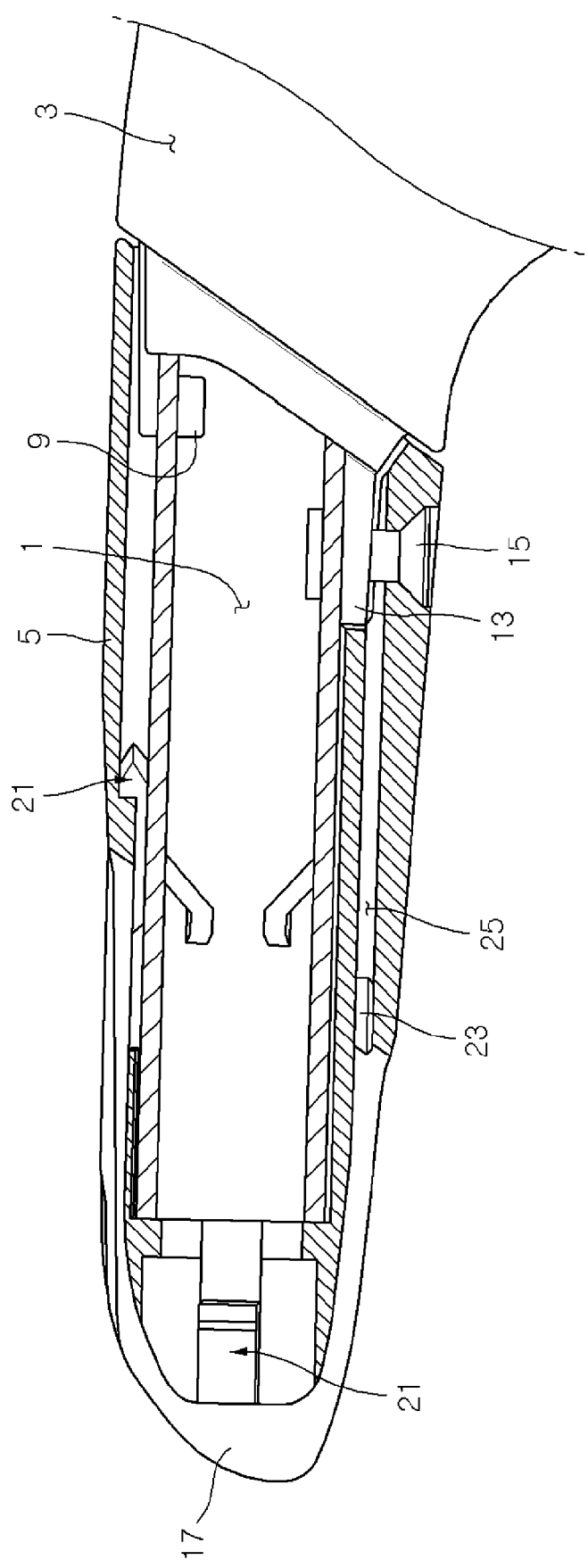
FIG. 3 is a cross-sectional view showing an assembly of the parts of FIG. 1.
Figure 4:
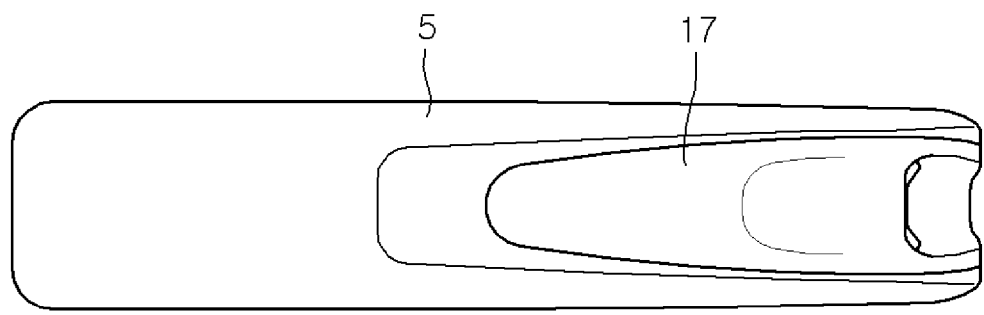
FIG. 4 is a view showing when a grip cover is combined with a cover cap, seen from above.
Figure 5:
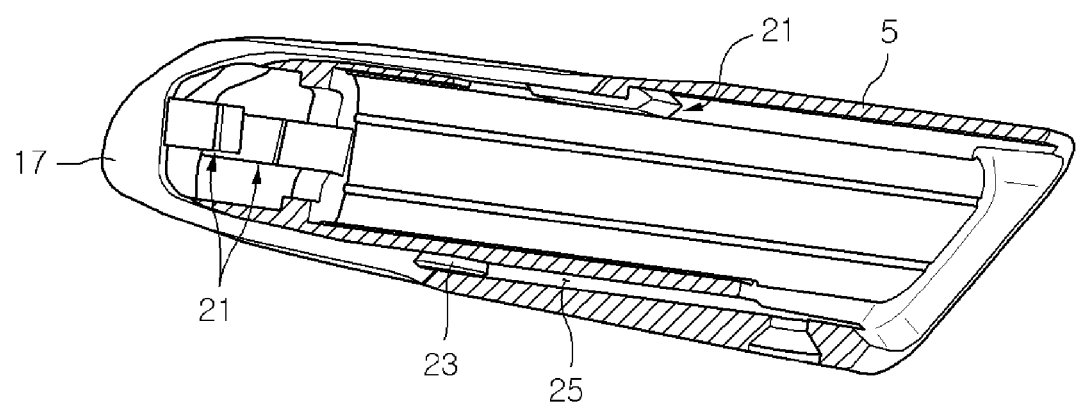
FIG. 5 is a three-dimensional cross-sectional view of the combined grip cover and the cover cap.

Lever frame 1 has groove or holes where locking hook 9 are fitted such that locking hook 9 is fitted, as shown in FIG. 3.

In various embodiments, the fixing mechanism includes a locking rib 13 extending between grip cover 5 and lever frame 1 from the lower portion of the portion connected with grip cover 5 of lower cover 3 and having a locking hole 11, and a fixing screw 15 tightened to lever frame 1 from under grip cover 5 through locking hole 11 of locking rib 13.

Lower cover 3 is combined with grip cover 5 by, with lower cover 3 fitted on lever frame 1, fitting grip cover 5 on lever frame 1 from the front end and tightening fixing-screw 15 to lever frame 1 through grip cover 5 and locking rib 13 of lower cover 3.

Alternatively, the fixing mechanism may be configured by pressing a pin instead of fixing screw 15.

A cover cap 17 is fitted on the front end of grip cover 5 and grip cover 5 has a fixing hole 18 and a fixing groove 19 which fix cover cap 17.

Cover cap 17 is formed to smoothly take the outer shape of grip cover 5, without protruding outside the outline of grip cover 5. That is, cover cap 17 finishes by itself the outer shape of grip cover 5 for the entire design and has a different color from grip cover 5 to improve the external appearance of the parking lever.

Although cover cap 17 may differ only in color, it is possible to use a different material from grip cover 5 to give a more elegant feel.

Fixing hole 18 is formed inside fixing groove 19 in grip cover 5 and cover cap 17 is fitted to grip cover 5 by a snap 21 through the fixing hole at two or more positions such that fixing hole 18 and snap 21 are not exposed to the outside.

In various embodiments, cover cap 17 is fitted to grip cover 5 at the top and both sides by a snap 21 and a retaining protrusion 23, which is inserted in grip cover 5, is formed at the lower portion of cover cap 17.

Retaining protrusion 23 prevent cover cap 17 from protruding down from grip cover 5, with the bottom of cover cap 17 leveled with the bottom of grip cover 5.

Accordingly, a grip groove 25 where retaining protrusion 23 is inserted is integrally formed in grip cover 5. For example, the grip groove may be monolithically formed in the grip cover.

Lower cover 3, grip cover 5, and cover cap 17 each have a shape easily formed to injection-mold a single part and can be assembled while easily covering lever frame 1 having a large bend angle.

Further, in various embodiments including the embodiment described above firmly snap-fit the parts to lever frame 1, using fixing screw 15, snap 21, and locking hook 9 and it is possible to implement aesthetically elegant external appearance of the parking lever, using the specific structure of cover cap 17 and grip cover 5.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking lever cover for a vehicle including a parking lever frame having a bend, the parking lever cover comprising:
    a lower cover covering the bend and a lower portion of the bend of the parking lever frame;
    a grip cover connected with the lower cover while covering the upper portion of the bend of the parking lever frame; and
    a fixing mechanism fixing the grip cover and the lower cover to the parking lever frame;
    wherein a cover cap is fitted on a front end of the grip cover and the grip cover has a fixing hole and a fixing groove for affixing the cover cap;
    wherein a shape of the cover cap conforms with an outer shape of the grip cover without protruding outside of the outline of the grip cover;
    wherein the fixing hole is formed inside the fixing groove;
    wherein the cover cap is fitted to the grip cover by a snap fitting through the fixing hole at two or more positions;
    wherein the cover cap is fitted to the grip cover at the top and both sides by the snap fitting,
    wherein a retaining protrusion is formed at the lower portion of the cover cap and inserted in the grip cover, and
    wherein a grip groove where the retaining protrusion is inserted is monolithically formed in the grip cover.

2. The parking lever cover for a vehicle as defined in claim 1, wherein the lower cover has a monolithically-formed arc shield at the lower portion to cover the parking brake system, and a monolithically-formed locking hook secured to the parking lever frame at the upper portion and connected with the grip cover.

3. The parking lever cover for a vehicle as defined in claim 2, wherein the fixing mechanism includes a locking rib extending between the grip cover and the parking lever frame from the lower portion connected with the grip cover of the lower cover and having a locking hole; and
    a fixing screw tightened to the parking lever frame from under the grip cover through the locking hole of the locking rib.

4. The parking lever cover for a vehicle as defined in claim 1, wherein the cover cap has a different color than the grip cover, and
    the grip cover is connected with the lower cover to form a sloped surface.

5. A parking lever cover for a vehicle including a parking lever frame having a bend, the parking lever cover comprising:
    a lower cover covering the bend and a lower portion of the bend of the parking lever frame;
    a grip cover connected with the lower cover while covering the upper portion of the bend of the parking lever frame;
    a fixing mechanism fixing the grip cover and the lower cover to the parking lever frame, and
    a cover cap fitted on a front end of the grip cover;
    wherein the lower cover has a monolithically-formed locking hook secured to the parking lever frame at the upper portion connected with the grip cover;
    wherein the fixing mechanism includes a locking rib extending between the grip cover and the parking lever frame from the lower portion connected with the grip cover of the lower cover and having a locking hole;
    wherein a fixing screw is tightened to the parking lever frame from under the grip cover through the locking hole of the locking rib;
    wherein the grip cover has a fixing hole and a fixing groove which fix the cover cap,
    wherein a shape of the cover cap conforms with an outer shape of the grip without protruding outside the outline of the grip cover,
    wherein the fixing hole is formed inside the fixing groove,
    wherein the cover cap is fitted to the grip cover by a snap structure through the fixing hole at two or more positions,
    wherein a retaining protrusion is formed at the lower portion of the cover cap and inserted in grip cover, and
    wherein a grip groove where the retaining protrusion is inserted is monolithically formed in the grip cover.

6. The parking lever cover for a vehicle as defined in claim 5, wherein the cover cap has a different color than the grip cover, and the grip cover is connected with the lower cover to form a sloped surface.

* * * * *